Jan. 13, 1959   R. F. CAROSELLI ET AL   2,868,668
METHOD OF FINISHING A GLASS FIBER TEXTILE
CLOTH AND ARTICLE PRODUCED THEREBY
Filed May 26, 1954

INVENTORS
Remus F. Caroselli
BY Roland K. Gagnon

Staelin & Overman
Attorneys

2,868,668

METHOD OF FINISHING A GLASS FIBER TEXTILE CLOTH AND ARTICLE PRODUCED THEREBY

Remus F. Caroselli and Roland K. Gagnon, Manville, R. I., assignors to Owens-Corning Fiberglas Corporation, a corporation of Delaware Application May 26, 1954, Serial No. 432,617

7 Claims. (Cl. 117—46)

This invention relates to the treatment of glass fibers in the manufacture of plain or colored fabrics and the like.

It is an object of this invention to produce and to provide a method for producing plain and colored glass fibers, preferably in fabric form, which can be washed, cleaned and handled as any other fabric without loss of color, strength or any of its other desirable characteristics.

Another object is to produce and to provide a method for producing a printed or otherwise colored glass fiber fabric which is freely launderable, dry cleanable, water repellent, light fast, strong, abrasion resistant, wrinkle proof and silky, coupled with many of the other desirable characteristics inherent in a glass fiber fabric, and it is a related object to achieve these same results in an uncolored fabric of glass fibers.

These and other objects and advantages of this invention will hereinafter appear and for purposes of illustration, but not of limitation, an embodiment of the invention is shown in the accompanying drawing in which—

Figure 1:
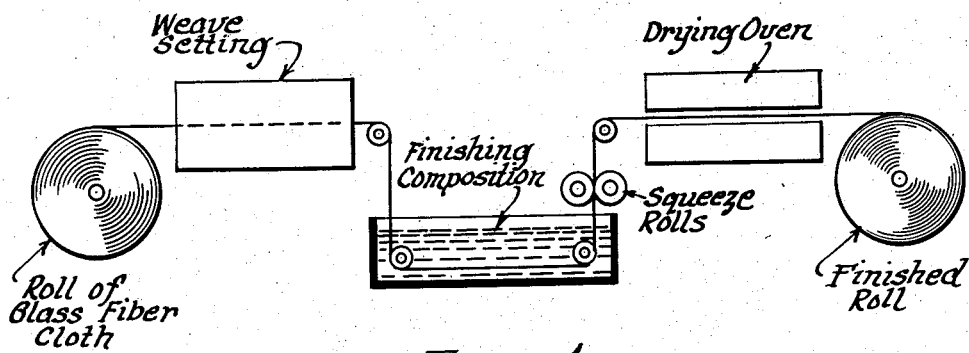
Figure 2:
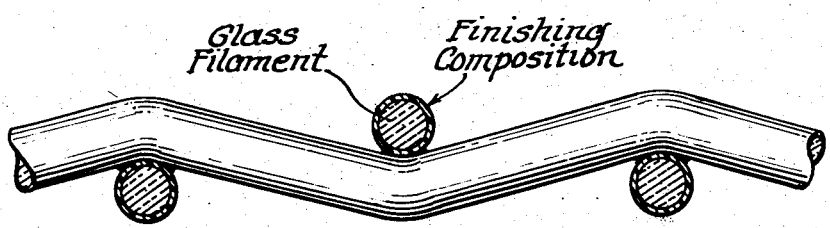

Fig. 1 is a schematic view of the equipment employed in a process for carrying out this invention, and Fig. 2 is an enlarged sectional view of a fragmentary portion of a glass fiber cloth treated in accordance with the practice of this invention.

Full advantage has not been taken of the excellent physical and chemical properties of glass fibers in fabrics because of the high breakage of the fibers in mutual abrasion and because of the difficulty in permanently coloring the glass fibers, especially while they are in fabric form. Extensive research has taught that the hydrophilic characteristics predominant on the glass fiber surfaces coupled with the perfectly smooth walls of the attenuated glass filaments of which the glass fiber strands or yarns are formed makes it difficult to cause anything to adhere to the glass fiber surfaces which might serve as a protective coating and as a base for coloring material. This lack of adhesion becomes very apparent under high humidity conditions, such as exist while laundering. The intervening water film which forms on the hydrophilic glass fiber surfaces reduces any chemical bond which might have existed, and with the lack of a physical bond on the smooth glass fiber surfaces, any coating can almost be wiped or peeled off.

It has been found that glass fibers, whether or not they are in fabric form, may be provided with the desired protective coating and, at the same time, permanently colored if, after the fibers have been cleaned to remove the size, they are treated with a composition in which the resinous component consists essentially of a polymer of acrylic acid and derivative thereof alone or in combination with a tinctorial agent, and then, after the coating has been set on the fiber surfaces, the fibers are treated with a highly receptive and adherent water repellent.

Removal of the size applied to the glass filaments in forming is not essential but the sucrose, gelatin or starchy and oleaginous materials of which the size for textile fibers are usually formed are best removed to develop maximum integration between the protective color coating and the glass fiber surfaces. The fibers may be cleaned by a water wash or by solvents, but it is preferred to burn the size from the glass fiber surfaces while at the same time employing a type of heat treatment of suitable intensity and duration substantially to set the fibers in the weave and to relax the fibers. Suffice it to say that the size may be burned off the fibers by prolonged heat treatment at 650° F. or more but for weave setting and fiber relaxation temperatures in the range of 1000–1250° F. for 1 second to 30 minutes are employed depending on the weight of the fabric and the temperature. Conditions suitable for heat cleaning and weave setting are described in the pending application of Waggoner Serial No. 91,843, now abandoned. When the fabric treated in accordance with this invention has been heat cleaned in a manner to also effect weave setting, the final product has the characteristics of the finest silks or satins, that is it has good hand, excellent draping qualities, and is wrinkleproof and creaseproof in addition to considerable improvement in the characteristics previously described.

Suitable acrylic acid ester polymers, with or without plasticizers, may be selected of such materials as methylmethacrylate, ethylmethacrylate, butylmethacrylate, ethylacrylate, ethylethacrylate, and the like. These may be employed in solvent solution but preferably are applied from aqueous dispersion or emulsion, such as Rhoplex FRN, a 40 percent aqueous dispersion of a non-ionic acrylic acid ester polymer, or Rhoplex WN-75, a 40 percent aqueous emulsion of a non-ionic acrylic polymer, both of which are manufactured and sold by the Rohm & Haas Company of Philadelphia, Pennsylvania. Use may be made also of Hycar PA which is an acrylic acid ester polymer marketed by the B. F. Goodrich Chemical Company of Cleveland, Ohio. When these acrylic polymers are used in the coating composition, concentrations ranging from 2–15 percent are used for dipping, spraying, piece dyeing and the like, while 15–25 percent by weight solids are used for roller coating or printing. For solvent solution, coal tar hydrocarbons such as benzene or toluene, esters such as ethyl acetate, Cellosolve acetate or ketones such as methyl ethyl ketone may be used. Suitable plasticizers include dibutyl phthalate, dicapryl phthalate, tricresyl phosphate or dibutyl sebacate.

The amount and type of tinctorial agent depends chiefly on the system employed for the treating composition and the intensity of color desired in the fabric. In a solvent system, it is possible to use an organic dye which is capable of solution in the solvents employed. In an aqueous system, use is made of water soluble dyestuffs which may or may not be subsequently set as in the formaldehyde setting dyes or use may be made of water dispersible pigments. Representative of suitable tinctorial agents are the nitroso pigments such as Naphthol Green Y, and Naphthol Green B; nitro pigments such as Naphthol Yellow S, Pigment Chlorine GG and Lithol Fast Yellow GG; azo pigments such as Toluidene red, para reds, Hansa yellows, permanent orange, benzidene yellows, Persian orange and lithol red; pyrazolone pigments such as Hansa Yellow R, basic dye pigments such as Malachite Green, Crystal Violet, Auromine O, Auromine G, Setoglaucine, Brilliant Green, Magenta, Methyl Violet, Rhodamine B, Thioflavin T, Methylene Blue; auxanthine dye pigments, anthroquinone pigments, vat color pigments and phthalocyanine pigments such as indigo, Ciba Violet, Algal Yellow, Monastral Blue, Syrian Blue and the like.

The particular methods for processing with these pigments and dyestuffs are clearly set forth for each in the coloring art and need no detailed description here. The amount of pigment depends upon the type being used and the intensity of color to be developed. Ordinarily it is sufficient to employ from 1–20 percent concentration in the treating composition. When pigment dispersions are employed it is best to formulate the treating composition with from 0.1–1.0 percent by weight or more of a dispersing agent such as a rosin soap, metal soap, fatty acid amine soap or the like. In the event that a plain uncolored glass fiber fabric is desired having the properties of increased abrasion resistance and good strength and feel, the same treating composition may be used without a tinctorial agent.

After the coating composition has been applied to the glass fiber fabric as by a dip, flow coat, roller coat, padder or spray process or the like, and after the coating has been set on the glass fiber surfaces as by drying, preferably in the presence of heat ranging from 200–350° F. for accelerating the evaporation of diluent and integration of the coating on the glass fiber surfaces, the coated fibers are treated with a water repellent such as stearato-chromyl chloride or other Werner complex compound wherein the acido group coordinated with the basic chromium or like atom has more than 10 carbon atoms such as is described in the Iler Patents No. 2,273,040 and No. 2,356,161. In the treatment of the coated fibers, solutions of the water repellent in concentrations ranging from 0.2–3.0 percent by weight give best results. Drying at 250–350° F. is sufficient to set the water repellent on the coated glass fiber surfaces such that the fibers readily shed water and the coating is not displaced from the glass fiber surfaces by a water film.

Instead of Werner complex compounds of the type described, other water repellent substances such as the cationic active compounds having more than 10 carbon atoms in the cationic group may be used in corresponding concentration. Suitable materials of the type described are disclosed in the patent to Sloan No. 2,356,542. Use may also be made of the polysiloxane fluids and polymers, paraffins, waxes and the like as water repellents applied to the treated glass fiber surfaces.

The described compositions are suitable for piece dyeing or for treating the fabric with a low viscosity composition. For printing on cleaned glass fiber fabric, the same coating composition may be formulated into a suitable printing paste by the addition of a water soluble embodying agent such as an alginate, methyl cellulose, hydroxyethyl cellulose, or carboxymethyl cellulose. 2–5 percent by weight alginate is sufficient to give a desired body for a screen printing paste while amounts ranging from 3–15 percent of the cellulose derivatives are desirable depending upon the degree of esterification.

The following examples for the practice of this invention are given by way of illustration, but not by way of limitation:

*Composition A for piece dyeing*

4.5 percent by weight methylmethacrylate polymer in aqueous dispersion
2.0 percent by weight pigment in aqueous dispersion (Aridye SX Type)
0.1 percent by weight dispersing agent (Blancal)
93.4 percent by weight water

*Composition B for piece dyeing*

10.0 percent by weight ethylacrylate polymer in aqueous dispersion
4.0 percent by weight Malachite Green in aqueous dispersion
0.2 percent by weight rosin soap, dispersing agent
85.8 percent by weight water

*Composition C for protective coating*

15.0 percent by weight acrylic acid polymer (Hycar PA) in aqueous dispersion
0.2 percent by weight dispersing agent
84.8 percent by weight water These coating compositions are applied to the fabric by a dip-squeeze process after the fabric has been heat cleaned for 3 minutes at 1050° F. to relax and weave set the fiber. The treated fabric is advanced through a drying oven at 250° F. for 10 minutes to drive off the diluent and set the colored polymer on the glass fiber surfaces. Thereafter, the fabric is submerged in a 1 percent solution of stearato-chromyl chloride and then the fabric is dried at a temperature of about 250° F. to insolubilize the lubricant on the glass fiber surfaces. When formulation A is employed, the deposited solids comprise about 2 percent by weight of the finished fabric. In treatments of the type described, it is best to provide for deposition of solids ranging from 1–10 percent by weight of the end products, all of which may be composed of the polymer coating in the event that color is not desired.

*Composition D for screen printing*

9.0 percent by weight non-ionic acrylic acid polymer in aqueous dispersion (Rhoplex FRN)
2.5 percent by weight sodium alginate
0.2 percent by weight dispersing agent
5.0 percent by weight Toluidene Red
83.3 percent by weight water

*Composition E for screen printing*

15.0 percent by weight hydroxyethyl cellulose (high viscosity)
6.0 percent by weight methylmethacrylate in aqueous dispersion
0.2 percent by weight dispersing agent
4.0 percent by weight Methyl Violet
74.8 percent by weight water Instead of hydroxy ethyl cellulose, carboxy methyl cellulose or methyl cellulose may be used. The paste is padded onto the cleaned glass fiber fabric in the usual manner for screen printing or in other types of printing and the treated fabric is treated at 200–350° F. for 1–10 minutes to drive off the diluent and set the color coating. The printed fabric is then treated with a 1 percent solution of stearyl ammonium chloride which is insolubilized on the glass fiber surfaces upon drying, usually in the presence of heat. Composition D represents about 9 percent by weight of the finished glass fiber fabric. When printing pastes are employed, the deposited solids may exceed the amount previously set forth, but may rise to 15 to 20 percent of the finished fabric, over half of which may be the polymer or copolymer.

Additional compositions for treating the glass fiber surfaces in strand, yarn or fabric form after the original size has been removed by heat treatment or by cleaning may be represented by the following:

*Composition F*

2.5 percent by weight methylmethacrylate polymer in aqueous dispersion
0.4 percent by weight wetting agent
87.1 percent by weight water

*Composition G*

5.0 percent by weight ethylmethacrylate polymer plasticized with 25% by weight dibutyl phthalate
0.3 percent by weight dispersing agent
94.7 percent by weight water Fabrics treated in accordance with this invention have markedly improved strength and abrasion resistance even after having been washed or dry cleaned a number of times. Color embodied with the coating composition is light fast and resistant to washing or dry cleaning. Thus by the sequence of treatments in accordance with this invention, overall color or color in pattern may be applied to glass fibers in fabric form by use of equipment conventional for the textile trade.

These marked improvements in a permanently colored glass fiber fabric are accompanied with considerable improvement in softness, feel and hand. When the fibers in the fabric have been properly relaxed and weave set, the fabric is also crease-proof and wrinkle-proof. It will be understood that treatment of the type described may be carried out with individual glass fiber filaments and strands to provide a protective coating or color when the coating composition is of low viscosity such as is used for piece dyeing.

This application is a continuation-in-part of our copending application Ser. No. 166,012, filed June 13, 1950, now Patent 2,686,737, issued August 17, 1954, entitled "Colored Glass Fibers and Method for Manufacturing the Same."

It will be understood that the above coating and coloring compositions may be applied to the glass fibers in forming. In this event, the application and removal of size can be eliminated and if a color coating is applied in forming, an overall color of good intensity is possible.

It will be further understood that numerous changes may be made in the formulations, their method of application and treatment without departing from the spirit of the invention, especially as defined in the following claims.

We claim:

1. The method of finishing a textile cloth of glass fibers to improve the hand and feel, comprising the steps of applying plural coatings as a finish on the glass fiber surfaces including first coating the glass fibers of the textile fabric from which all previous size has been removed to provide a thin coating of a composition containing a diluent in which the polymeric solids consist essentially of an acrylic acid ester polymer, heating the coated fibers to drive off the diluent and to set the polymer as a thin coating on the glass fiber surfaces and then coating the said coated fibers with a water repellent selected from the group consisting of a Werner complex compound in which the carboxylato group has more than 10 carbon atoms and a cationic amine compound having an organic group attached directly to the basic nitrogen atom containing more than 10 carbon atoms, and drying the fibers to set the water repellent on the acrylic acid ester polymer coated glass fibers.

2. The method as claimed in claim 1 in which the acrylic acid ester polymer is present in the coating composition in an amount within the range of 2–25 percent by weight.

3. The method as claimed in claim 1 in which the first coating on the glass fibers contains a coloring pigment in an amount within the range of 1–20 percent by weight of the coating composition.

4. The method of finishing a textile cloth of glass fibers to improve the hand and feel thereof, comprising the steps of heating the textile fabric of glass fibers at a temperature and for a time sufficient cleanly to burn off the size from the glass fiber surfaces and to weave set and relax the fibers in the fabric, and then applying plural coatings onto the heat cleaned and weave set glass fibers of the fabric by first coating the heat cleaned glass fibers of the textile fabric to provide a thin coating on the surfaces thereof of a composition containing a diluent and in which the polymeric solids consist essentially of an acrylic acid ester polymer, heating the coated fibers to drive off the diluent in the coating composition and to set the acrylic acid ester polymer as a thin coating on the glass fiber surfaces, applying a second coating onto the said coated fibers formed of a water repellent selected from the group consisting of a Werner complex compound in which the carboxylato group has more than 10 carbon atoms and a cationic amine compound having an organic group attached directly to the basic nitrogen atom containing more than 10 carbon atoms, and then drying the fibers to drive off the diluent and insolubilize the water repellent on the surfaces of the coated fibers.

5. The method as claimed in claim 4 in which the textile fabric of glass fibers is heated prior to the application of the plural coatings at a temperature within the range of 1000–1250° F. for from 1–30 seconds until the size originally applied to the glass fiber surfaces is completely burned off and the glass fibers become weave set and relaxed in the textile fabric.

6. The method as claimed in claim 4 in which the coating composition applied as a first coating onto the cleaned glass fiber surfaces contains a coloring pigment in the ratio of 1–20 parts by weight of pigment to 2–25 parts by weight of the acrylic acid ester polymer.

7. A textile cloth of glass fibers having plural coatings present as a finish on the glass fiber surfaces to improve the hand and feel wherein the first coating directly in contact with the glass fibers consists essentially of an acrylic acid ester polymer and in which the second coating is a water repellent selected from the group consisting of a Werner complex compound in which the carboxylato group has more than 10 carbon atoms and a cationic amine compound having an organic group attached directly to the basic nitrogen atom containing more than 10 carbon atoms.

References Cited in the file of this patent

UNITED STATES PATENTS

| Number | Name | Date |
|---|---|---|
| 1,636,511 | Hering | July 19, 1927 |
| 2,273,040 | Iler | Feb. 17, 1942 |
| 2,356,542 | Sloan | Aug. 22, 1944 |
| 2,369,876 | Warren | Feb. 20, 1945 |
| 2,446,119 | White | July 27, 1948 |
| 2,468,086 | Latham et al. | Apr. 26, 1949 |
| 2,504,136 | Lee | Apr. 18, 1950 |
| 2,582,919 | Biefeld | Jan. 15, 1952 |
| 2,604,688 | Slayter | July 29, 1952 |
| 2,633,428 | Klug | Mar. 31, 1953 |
| 2,673,825 | Biefeld et al. | Mar. 30, 1954 |
| 2,686,737 | Caroselli et al. | Aug. 17, 1954 |
| 2,703,774 | Morrison | Mar. 8, 1955 |